(12) United States Patent
Aoki et al.

(10) Patent No.: US 11,609,783 B2
(45) Date of Patent: Mar. 21, 2023

(54) SIGNAL PROCESSOR AND SIGNAL PROCESSING METHOD

(71) Applicant: YAMAHA CORPORATION, Hamamatsu (JP)

(72) Inventors: Ryotaro Aoki, Hamamatsu (JP); Akihiko Suyama, Hamamatsu (JP); Tatsuya Fukuyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/482,677

(22) Filed: Sep. 23, 2021

(65) Prior Publication Data

US 2022/0012090 A1 Jan. 13, 2022

Related U.S. Application Data (63) Continuation of application No. 16/837,430, filed on Apr. 1, 2020, now Pat. No. 11,182,199.

(30) Foreign Application Priority Data

Apr. 5, 2019 (JP) .............................. JP2019-072887

(51) Int. Cl.
*G06F 9/48* (2006.01)
*G06F 3/04883* (2022.01)
*G06F 9/38* (2018.01)
*H04S 7/00* (2006.01)

(52) U.S. Cl.
CPC ............ *G06F 9/48* (2013.01); *G06F 3/04883* (2013.01); *G06F 9/3836* (2013.01); *H04S 7/303* (2013.01)

(58) Field of Classification Search
CPC ........................................................ G06F 9/48
See application file for complete search history.

(56) References Cited

U.S. PATENT DOCUMENTS

| 7,979,282 B2 | 7/2011 | Kim |
| 2007/0263884 A1 | 11/2007 | Bedingfield |
| 2013/0163786 A1* | 6/2013 | Miyata ................... H04H 60/04 381/119 |

(Continued)

FOREIGN PATENT DOCUMENTS

| CN | 111741412 A | 10/2020 |
| JP | 2001175623 A | 6/2001 |

(Continued)

OTHER PUBLICATIONS

Extended European Search Report issued in European Appln. No. 20167834.9 dated Aug. 31, 2020.

(Continued)

*Primary Examiner* — Olisa Anwah
(74) *Attorney, Agent, or Firm* — Rossi, Kimms & McDowell LLP (57) ABSTRACT

A signal processor and a signal processing method thereof. The signal processor obtain a first audio signal of a first channel, obtains a second audio signal of a second channel. The signal processor performs a first signal processing on the input first audio signal. The signal processor, when it does not obtain the second audio signal, performs a second signal processing on the input first audio signal having undergone the first signal processing and output a further processed first audio signal.

18 Claims, 9 Drawing Sheets

(56) References Cited

U.S. PATENT DOCUMENTS

| | | |
|---|---|---|
| 2014/0067385 A1 | 3/2014 | Oliveira |
| 2016/0212563 A1 | 7/2016 | Yuyama |
| 2017/0345409 A1 | 11/2017 | Fujisawa |

FOREIGN PATENT DOCUMENTS

| | | |
|---|---|---|
| JP | 2017212573 A | 11/2017 |
| RU | 2010141970 A | 4/2012 |

OTHER PUBLICATIONS

Office Action issued in U.S. Appl. No. 16/837,430 dated Jun. 14, 2021.
Notice of Allowance issued in U.S. Appl. No. 16/837,430 dated Sep. 21, 2021.
Office Action issued in Chinese Appln. No. 202010216194.4 dated Mar. 12, 2021. English machine translation provided.
Office Action issued in Japanese Appln. No. 2019-072887 dated Jan. 10, 2023. English translation provided.

* cited by examiner

SIGNAL PROCESSOR AND SIGNAL PROCESSING METHOD

CROSS REFERENCE TO RELATED APPLICATION

This application is based upon and claims the benefit of priority of Japanese Patent Application No. 2019-072887 filed on Apr. 5, 2019, the contents of which are incorporated herein by reference in its entirety.

BACKGROUND OF THE INVENTION

1. Field of the Invention

An embodiment of this invention relates to signal processing of an audio signal.

2. Description of the Related Art

Recently, an audio signal processor has been present in which multichannel audio signals are input, signal processing is performed on the audio signals by a signal processing portion and the audio signals having undergone the signal processing are output from a plurality of speakers (for example, see JP-A-2017-212573).

In a signal processor that performs signal processing for each channel, there are cases where a channel where no audio signal is input is present. That is, in a case where the number of input audio signals is smaller than the number of channels, a signal processing portion and a memory corresponding to an audio signal of an unused channel are present. In this case, the resource for the audio signal of the unused channel is a waste.

SUMMARY OF THE INVENTION

Accordingly, an object of an embodiment of this invention is to enable effective use of the resource of the unused channel.

A signal processor according to an aspect of the present invention includes a memory storing instructions and a processor that implement the stored instructions to execute a plurality of tasks including a first input task, a second input task, a first signal processing task, a second signal processing task, and a control task. The first input task is configured to obtain a first audio signal of a first channel and the second input task is configured to obtain a second audio signal of a second channel. Thea first signal processing task is configured to perform a first signal processing on the input first audio signal and output a processed first audio signal and the second signal processing task is configured to perform a second signal processing on the input second audio signal. The control task is configured to, in a case where the second input task does not obtain the second audio signal, cause the second signal processing task to perform the second signal processing on the processed first audio signal and output a further processed first audio signal by automatically outputting the processed first audio signal to the second signal processing performed by the second signal processing task.

Another aspect is a signal processing method that performs the functions of the plurality of tasks.

According to the aspect of the present invention, the resource for an audio signal of an unused channel can be effectively used.

DETAILED DESCRIPTION OF THE EXEMPLARY EMBODIMENTS

Figure 1:
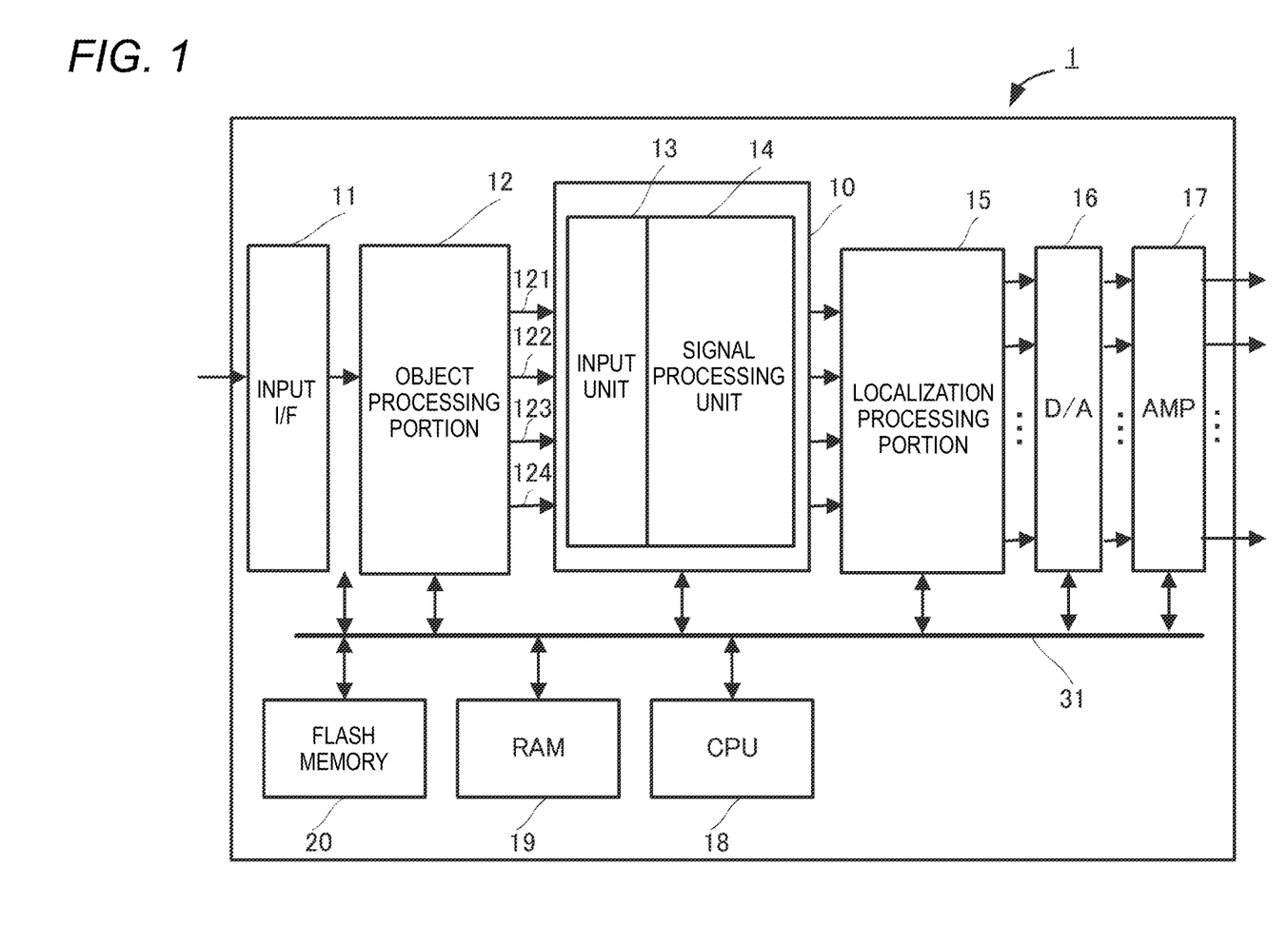
FIG. 1 is a block diagram showing a structure of a principal part of a signal processor.

FIG. 1 is a block diagram showing a structure of a principal part of a signal processor 1. The signal processor 1 of the present embodiment will be described with reference to the drawings.

The signal processor 1 is, for example, a personal computer, a set-top box, an audio receiver or a powered speaker (a speaker with built-in amplifier). The signal processor 1 decodes contents data and extracts an audio signal from the decoded contents data. The contents data is obtained from, for example, an external reproduction apparatus, a network or a storage medium. The signal processor 1 may obtain a digital audio signal or an analog audio signal.

In the present embodiment, if not specifically mentioned, the audio signal means a digital signal.

As shown in FIG. 1, the signal processor 1 includes an input I/F (interface) 11, an object processing portion 12, an input unit 13, a signal processing unit 14, a localization processing portion 15, a D/A converter 16, an amplifier (AMP) 17, a CPU 18, a flash memory (ROM) 20, a RAM 19 and a bus 31. In this case, the bus 31 interconnects the input I/F 11, the object processing portion 12, the input unit 13, the signal processing unit 14, the localization processing portion 15, the D/A converter 16, the amplifier (AMP) 17, the CPU 18, the flash memory 20 and the RAM 19.

The CPU 18 integrally controls the signal processor 1. The CPU 18 reads a predetermined program stored in the flash memory 20 as a storage to the RAM 19. Thereby, the CPU 18 performs various operations. The CPU 18 referred to in this example corresponds to the control portion of the present invention. The RAM 19 referred to in this example corresponds to the temporary storage of the present invention.

The input I/F 11 has an interface such as an HDMI (trademark). The input I/F 11 receives contents data and outputs it to the object processing portion 12. Moreover, the input I/F 11 may receive a digital audio signal or an analog audio signal.

The object processing portion 12 is configured by, for example, a DSP. In a case where the input contents data conforms to the object base method, the object processing portion 12 decodes the contents data received from the input I/F 11, and extracts the audio signal of each object (sound source) and position data representative of the position of each object. According to the object base method, a plurality of objects (sound sources) contained in the contents are stored as independent audio signals.

The object processing portion 12 assigns the extracted audio signals of the objects to a plurality of (in FIG. 2, four) channels. For example, in a case where audio signals of four objects are extracted, the object processing portion 12 assigns the extracted four audio signals to a first channel 121, a second channel 122, a third channel 123 and a fourth channel 124.

In a case where the input contents data conforms to the channel base method, the object processing portion 12 analyzes the audio signals input from the input I/F 11, and extracts the position data of the objects. The object processing portion 12 calculates the level of the audio signal of each channel and the cross-correlation between the channels. The object processing portion 12 estimates the position of the sound source based on the level of the audio signal of each channel and the cross-correlation between the channels. For example, in a case where the correlation value between the L channel and the SL channel is high and the level of the L channel and the level of the SL channel are high (exceed a predetermined threshold value), the object processing portion 12 estimates that a sound source is present between the L channel and the SL channel. The object processing portion 12 estimates the position of the sound source based on the level of the L channel and the level of the SL channel. For example, when the ratio between the level of the L channel and the level of the SL channel is 1:1, the object processing portion 12 estimates that the position of the sound source is just at the middle point between the L channel and the SL channel. The larger the number of channels is, the more accurately the object processing portion 12 can estimate the position of the sound source. By calculating the correlation value between a multiplicity of channels, the object processing portion 12 can substantially uniquely identify the position of the sound source.

Moreover, the object processing portion 12 inputs the position data of the object to the CPU 18.

In the following description, the first channel 121, the second channel 122, the third channel 123 and the fourth channel 124 will be collectively referred to as channels 121 to 124.

The input unit 13 and the signal processing unit 14 are configured by a DSP 10. The input unit 13 receives the audio signals assigned to the channels 121 to 124 by the object processing portion 12. The signal processing unit 14 performs digital signal processing on the audio signals input from the input unit 13 by frame processing. The signal processing unit 14 inputs the audio signals of the objects having undergone the signal processing to the localization processing portion 15. Details of the input unit 13 and the signal processing unit 14 will be described later.

The localization processing portion 15 is configured by, for example, a DSP. The localization processing portion 15 performs sound image localization processing according to an instruction of the CPU 18. The localization processing portion 15 performs sound image localization in units of objects, based on the position data of each object obtained by the object processing portion 12, so that the sound image is localized in a position corresponding to the position data of each object specified by the CPU 18. The localization processing portion 15 distributes the audio signal of each object to a plurality of speakers with a predetermined gain so that the sound image is localized in a position corresponding to the position information of each object. The localization processing portion 15 inputs the audio signals for the speakers to the D/A converter 16.

The plurality of speakers are placed, for example, indoors (in a room). For example, when the shape of the room is a rectangular parallelepiped, the four speakers are placed in the four corners of the floor of the room, respectively. Moreover, for example, another speaker is placed at the front of the room. Moreover, for example, other two speakers are placed on the ceiling in the room.

The shape of the room is not limited to a rectangular parallelepiped. It is necessary only that the plurality of speakers be placed according to the shape of the room.

The D/A converter 16 converts the audio signals into analog signals. The AMP 17 amplifies the analog audio signals, and inputs them to the speakers.

In this example, the input unit 13 and the signal processing unit 14 receive audio signals of objects of up to four channels, and perform signal processing on the audio signals.

Figure 2:
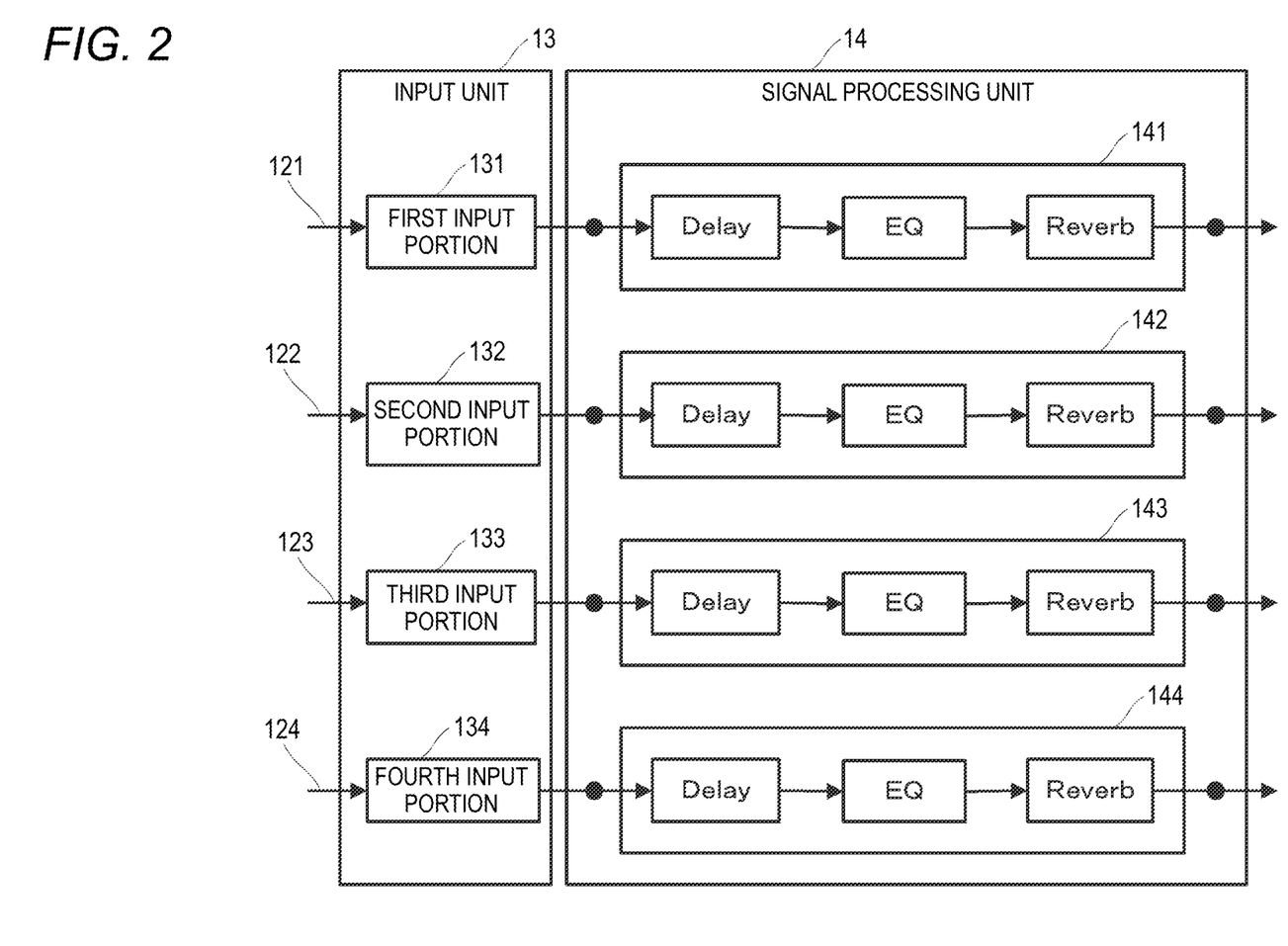
FIG. 2 is a view showing the relation of connection between an input unit and a signal processing unit.

Details of the input unit 13 and the signal processing unit 14 will be described with reference to FIG. 2. FIG. 2 is a view showing the relation of connection between the input unit 13 and the signal processing unit 14.

As shown in FIG. 2, the input unit 13 includes a first input portion 131, a second input portion 132, a third input portion 133 and a fourth input portion 134. The first input portion 131, the second input portion 132, the third input portion 133 and the fourth input portion 134 will be collectively referred to as input portions 131 to 134.

The first input portion 131 receives the audio signal of the first channel 121. The second input portion 132 receives the audio signal of the second channel 122. The third input portion 133 receives the audio signal of the third channel 123. The fourth input portion 134 receives the audio signal of the fourth channel 124.

The signal processing unit 14 includes a first signal processing portion 141, a second signal processing portion 142, a third signal processing portion 143 and a fourth signal processing portion 144. The first signal processing portion 141, the second signal processing portion 142, the third signal processing portion 143 and the fourth signal processing portion 144 will be collectively referred to as signal processing portions 141 to 144.

The first signal processing portion 141 performs signal processing on the audio signal of the first channel 121 input from the first input portion 131. The second signal processing portion 142 performs signal processing on the audio signal of the second channel 122 input from the second input portion 132. The third signal processing portion 143 performs signal processing on the audio signal of the third channel 123 input from the third input portion 133. The fourth signal processing portion 144 performs signal processing on the audio signal of the fourth channels 124 input from the fourth input portion 134.

The signal processing portions 141 to 144 perform signal processing of the audio signals of a plurality of (four) channels 121 to 124 for each one frame. The CPU 18 previously allocates the RAM 19 for the resource of this one frame.

In this example, the signal processing portions 141 to 144 each perform signal processing of delay, equalizer (EQ) and reverb, which are three kinds of effects, on the audio signal of each object. In this example, the kinds and number of effects of the signal processing of each of the signal processing portions 141 to 144 are the same.

The signal processing portions 141 to 144 each perform signal processing of the audio signal of each of the four channels 121 to 124, and output these audio signals to the localization processing portion 15.

Figure 3:
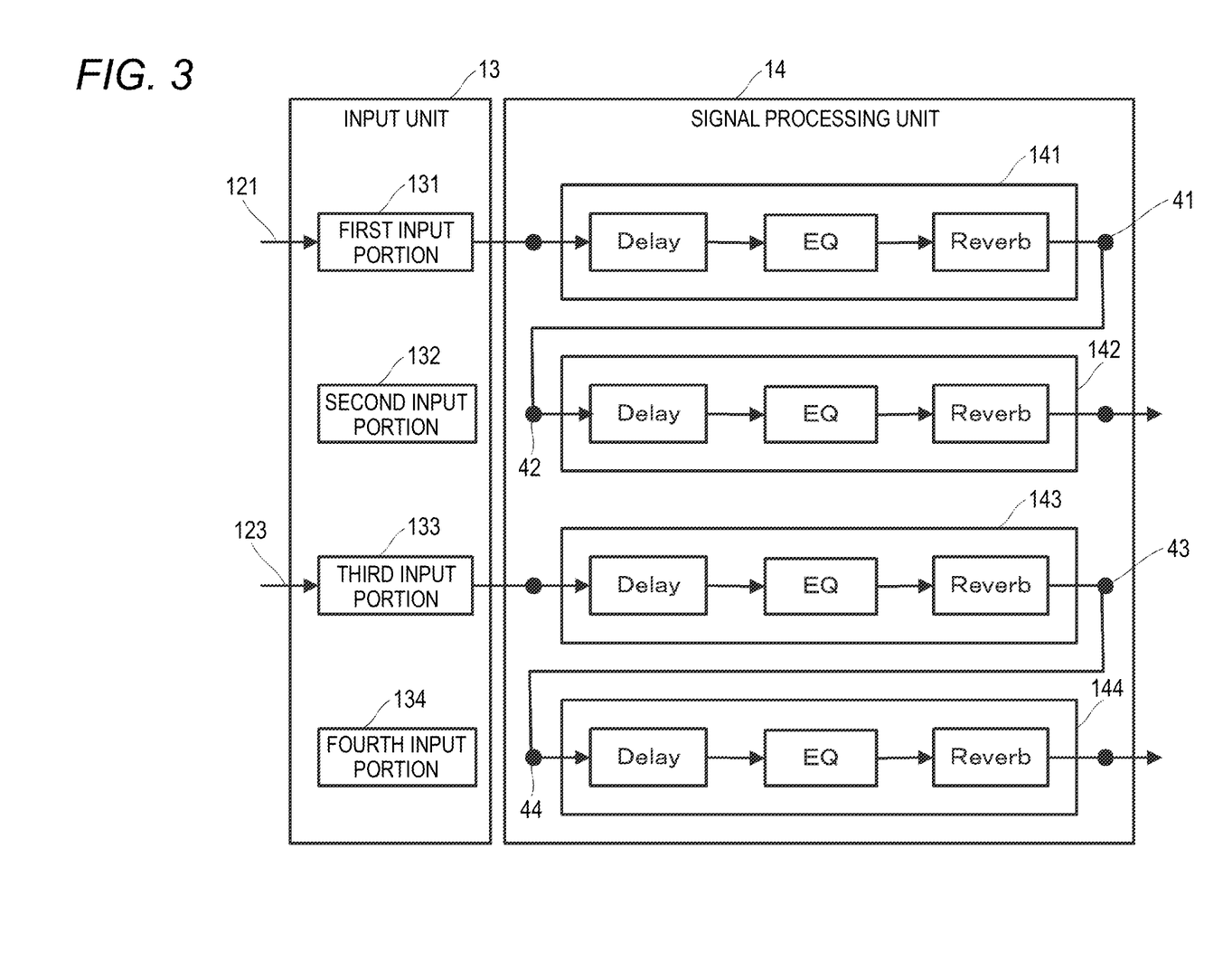
FIG. 3 is the relation of connection between the input unit and the signal processing unit and is a view showing an example different from that of FIG. 2.

Now, a case where the input I/F 11 inputs contents data containing audio signals of two objects will be described with reference to FIG. 3. FIG. 3 is the relation of connection between the input unit 13 and the signal processing unit 14. The example of FIG. 3 shows a case where the number of audio signals extracted by the object processing portion 12 is smaller than the number of channels 121 to 124.

The object processing portion 12 extracts the audio signal of each object from the contents data. The audio signal extracted by the object processing portion 12 is assigned to the first channel 121 and the third channel 123. The object processing portion 12 does not input the audio signal to the second channel 122 or the fourth channel 124. That is, in this example, the second channel 122 and the fourth channel 124 are not used. The object processing portion 12 further extracts the position data of the object of the extracted audio signal.

In this case, the signal processor 1 causes the second signal processing portion 142 corresponding to the unused second channel 122 to process the audio signal assigned to the first channel 121. Moreover, the signal processor 1 causes the fourth signal processing portion 144 corresponding to the unused fourth channels 124 to process the audio signal assigned to the third channel 123.

In more detail, as shown in FIG. 3, the CPU 18 connects an output end 41 on the output side of the first signal processing portion 141 to an input end 42 on the input side of the second signal processing portion 142. Further, the CPU 18 connects an output end 43 on the output side of the third signal processing portion 143 to an input end 44 on the input side of the fourth signal processing portion 144.

Thereby, the audio signals of the first channel 121 and the third channel 123 enjoy effects of signal processing of two delays, two equalizers and two reverbs. Since the signal processing portions 141 to 144 are processing within one frame, it is unnecessary to increase resources even if the audio signals of the first channel 121 and the third channel 123 process signal processing of two delays, two EQs and two reverbs.

For example, for the audio signal of the first channel 121, by using the reverb of the second signal processing portion 142, twice the length (tap length) can be realized within one frame compared with a case where the second signal processing portion 142 is not used. Therefore, by the audio signals of the first channel 121 and the third channel 123 using the signal processing of two delays, two EQs and two reverbs in combination, the signal processor 1 can perform a variety of expressions with already secured resources, for example, with allocated memory and an redundant capability of the CPU.

The signal processing unit 14 outputs the signal-processed audio signal of the first channel 121 to the localization processing portion 15 from the output side of the second signal processing portion 142. Moreover, the signal processing unit 14 outputs the signal-processed audio signal of the third channel 123 to the localization processing portion 15 from the output side of the fourth signal processing portion 144.

Figure 4:
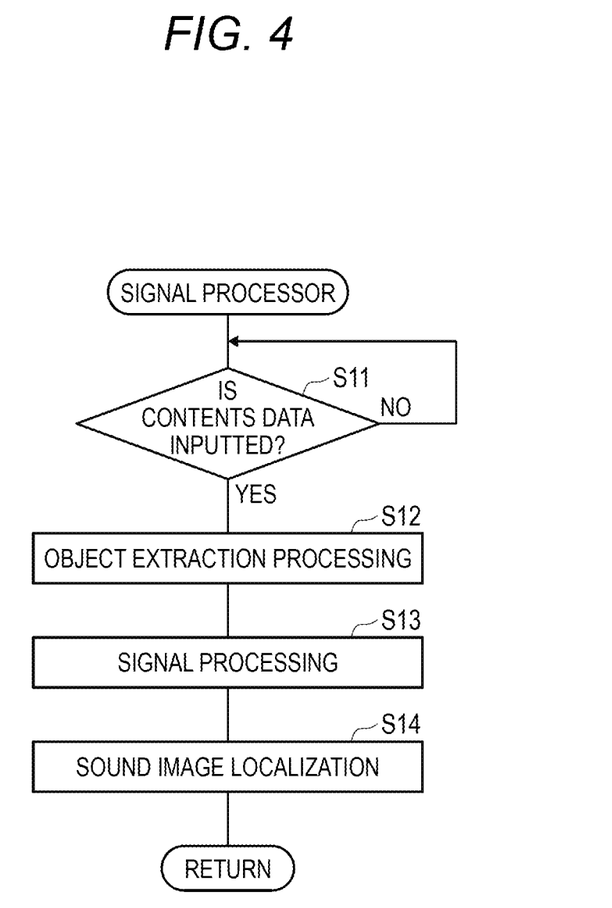
FIG. 4 is a flowchart showing an example of the operation of the signal processor.
Figure 5:
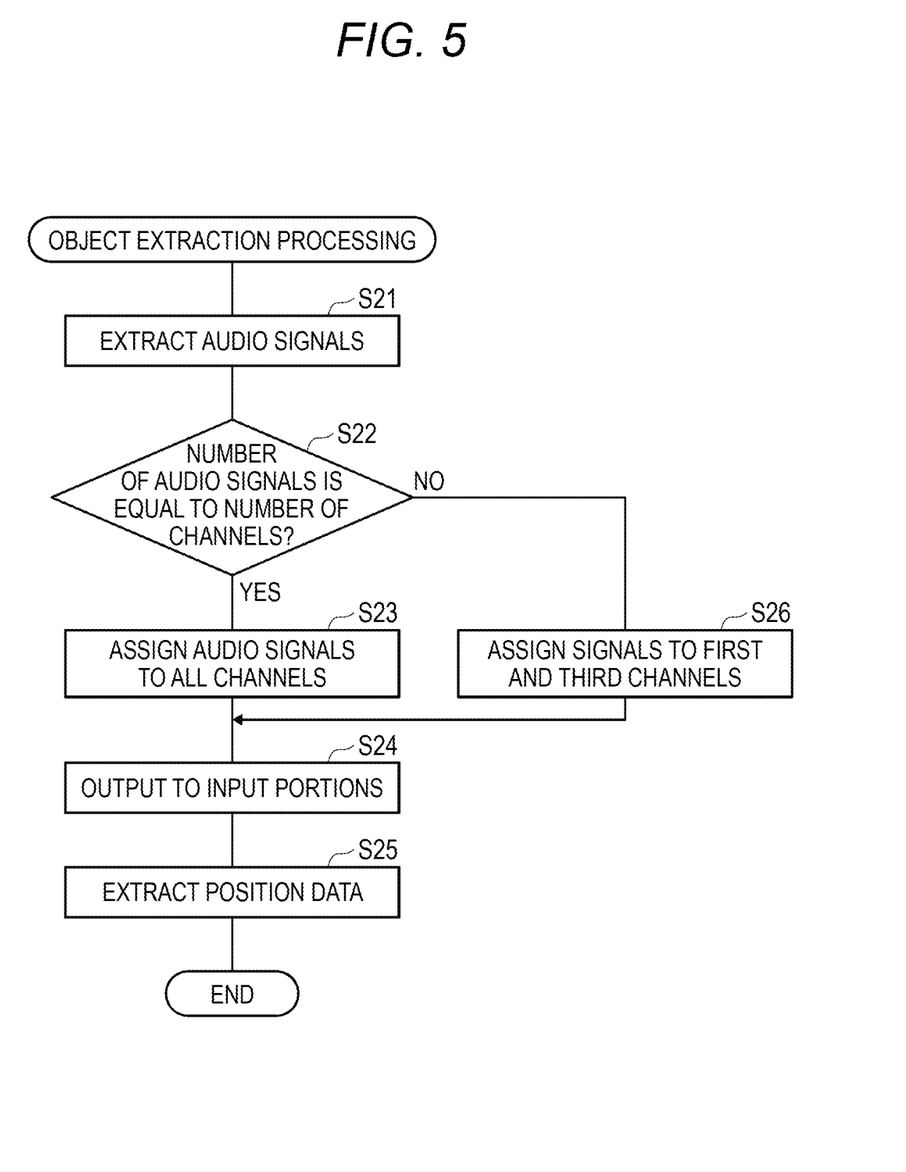
FIG. 5 is a flowchart showing an example of object extraction processing.
Figure 6:
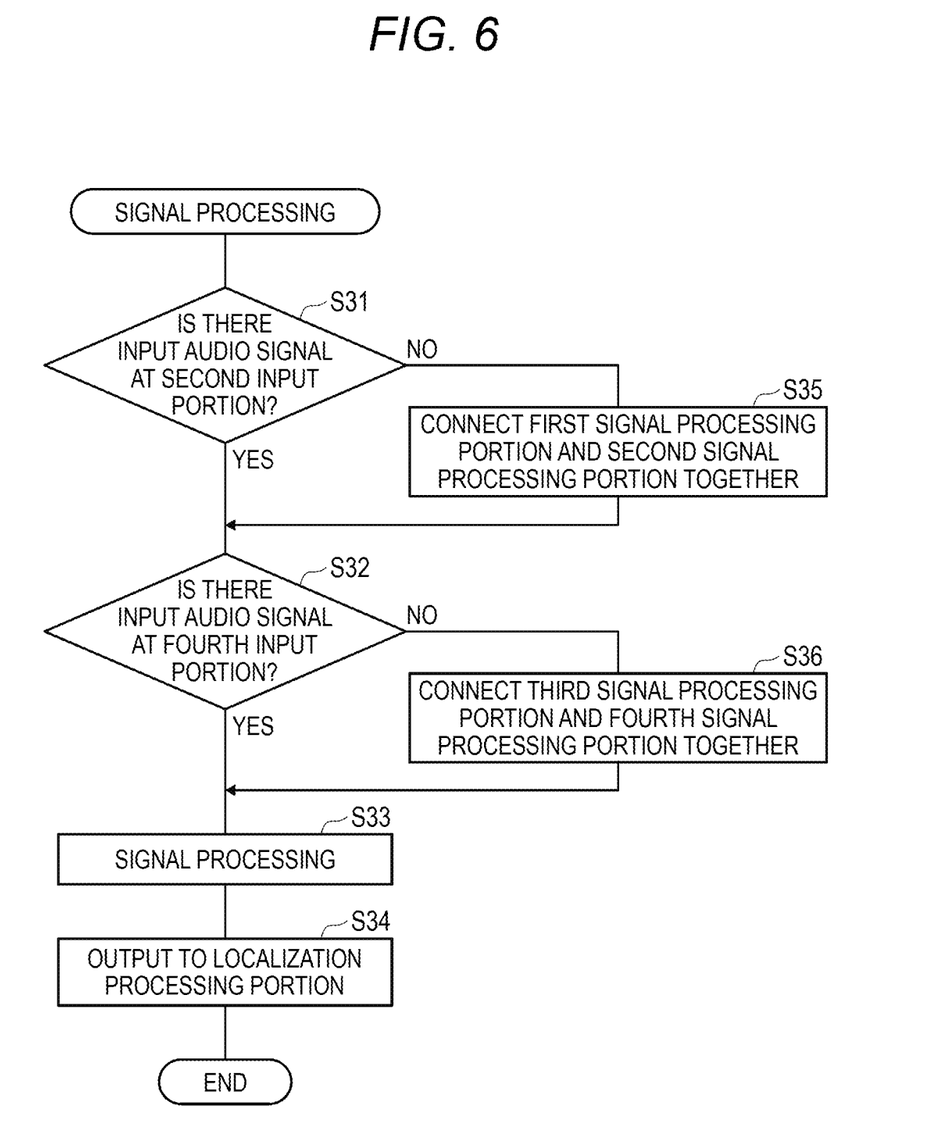
FIG. 6 is a flowchart showing an example of signal processing.

An example of the operation of the signal processor 1 will be described with reference to FIGS. 4, 5 and 6. FIG. 4 is a flowchart showing the example of the operation of the signal processor 1. FIG. 5 is a flowchart showing an example of object extraction processing by the object processing portion 12. FIG. 6 is a flowchart showing an example of signal processing by the signal processing unit 14. In the following, description will be given with respect to a case where contents data contains audio signals of four objects and a case where it contains audio signals of two objects.

When the input I/F 11 inputs contents data (S11: Yes), the object processing portion 12 performs object extraction processing (S12). When the object processing portion 12 finishes the object extraction processing, the signal processing unit 14 performs signal processing (S13). When the signal processing unit 14 finishes the signal processing, sound image localization by the localization processing portion 15 is performed (S14).

The object extraction processing will be described with reference to FIG. 5. The object processing portion 12 extracts the audio signal of each object from the contents data (S21). When the number (four) of audio signals of the objects is the same as the number (four) of channels (S22: Yes), the object processing portion 12 assigns the extracted four audio signals to the four channels 121 to 124 (S23). The object processing portion 12 inputs the audio signals assigned to the four channels 121 to 124, respectively, to the corresponding input portions 131 to 134 (S24). The object processing portion 12 extracts the position data of each object (S25).

On the other hand, when the number (two) of audio signals is different smaller) from the number (four) of channels (S22: No), the object processing portion 12 assigns the extracted two audio signals to the first channel 121 and the third channel 123, respectively (S26). The object processing portion 12 shifts the process to S24. In this case, the second input portion 132 and the fourth input portion 134 input no audio signals.

The position data extraction (S25) may be performed at any timing as long as it is performed after the extraction of the audio signals by the object processing portion 12. Moreover, a structure may be adopted in which the object processing portion 12 automatically assigns the extracted two audio signals to the first channel 121 and the third channel 123, respectively. Moreover, the object processing portion 12 may assign the extracted two audio signals to the first channel 121 and the third channel 123, respectively, according to external setting, for example, setting by the user.

The signal processing will be described with reference to FIG. 6. When the second input portion 132 and the fourth input portion 134 have input audio signals (S31: Yes, S32: Yes), the plurality of signal processing portions 141 to 144 perform the signal processing on the audio signals input from the plurality of input portions 131 to 134, respectively (S33). The signal processing portions 141 to 144 each output the signal-processed audio signal to the localization processing portion 15 (S34).

On the other hand, when the second input portion 132 has input no audio signal (S31: No), the CPU 18 connects the first signal processing portion 141 and the second signal processing portion 142 (S35) together. Moreover, when the fourth input portion 134 has input no audio signal (S32: No), the CPU 18 connects the third signal processing portion 143 and the fourth signal processing portion 144 together (S36). The signal processing unit 14 shifts the process to S33. In this case, the signal processing unit 14 outputs the signal-processed audio signals to the localization processing portion 15 from the second signal processing portion 142 and the fourth signal processing portion 144 (S34).

A structure may be adopted in which the CPU 18 automatically connects the first signal processing portion 141 and the second signal processing portion 142 together. Moreover, the CPU 18 may connect the first signal processing portion 141 and the second signal processing portion 142 together according to external setting, for example, setting by the user.

Figure 7:
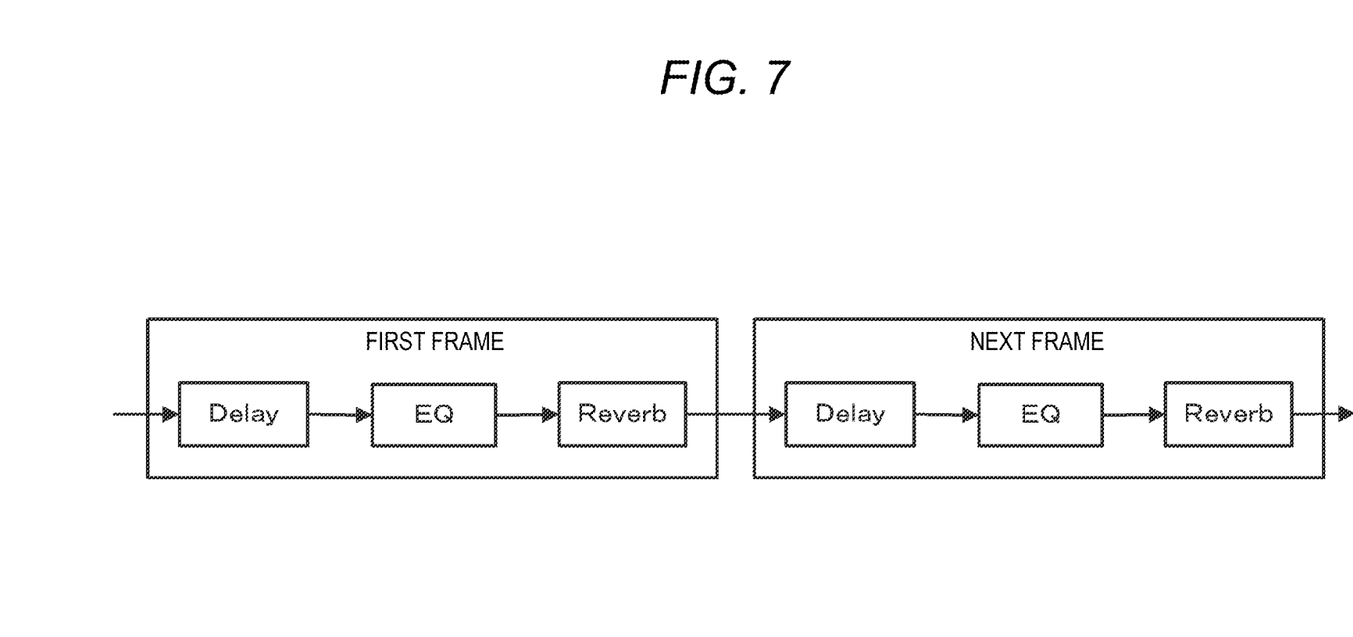
FIG. 7 is a view showing an example of signal processing of a comparative example.

For example, in a conventional signal processor of a comparative example, as shown in FIG. 7, a next frame is newly added in order to increase signal processing (for example, the number of effects) of a desired audio signal. In the signal processor of the comparative example, the addition of the next frame makes it necessary to secure a new resource in the RAM. As described above, in the conventional signal processor of the comparative example, since the CPU causes the RAM to secure a new resource, the capacity of the RAM used increases and the time required for the signal processing increases, so that an output delay occurs.

On the other hand, in a case where it is intended to increase the signal processing (for example, the number of effects) of the audio signal of the first channel 121, if the second channel 122 is not used, the signal processor 1 of the present embodiment performs the signal processing of the first signal processing portion 141 and the second signal processing portion 142 on the audio signal of the first channel 121 in the order of the signal processing of the first signal processing portion 141 and the signal processing of the second signal processing portion 142. Moreover, in a case where it is intended to increase the signal processing (for example, the number of effects) of the audio signal of the third channel 123, if the fourth channel 124 is not used, the signal processor 1 performs the signal processing of the third signal processing portion 143 and the fourth signal processing portion 144 on the audio signal of the third channel 123 in the order of the signal processing of the third signal processing portion 143 and the signal processing of the fourth signal processing portion 144.

In the signal processor 1 of the present embodiment, signal processing in one frame is performed in the order of the first signal processing portion 141, the second signal processing portion 142, the third signal processing portion 143 and the fourth signal processing portion 144 (see FIG. 2). That is, for example, if the output side of the second signal processing portion 142 and the input side of the first signal processing portion 141 are connected together and the processing is performed in the order of the second signal processing portion 142 and the first signal processing portion 141, the signal processing is the same as the one of the conventional signal processor (see FIG. 7).

Thereby, in the signal processor 1 of the present embodiment, since a resource, for example, an allocated memory and an redundant capability of the CPU, is previously secured so that signal processing can be performed in one frame on the audio signals of the channels 121 to 124, the signal processing portions for unused channels can be effectively used.

Moreover, the signal processor 1 of the present embodiment processes the audio signals in one frame. Thereby, the signal processor 1 of the present embodiment does not cause a delay due to increase in signal processing compared with the signal processor of the comparative example. Moreover, since the signal processor 1 of the present embodiment does not cause a delay due to increase in signal processing, real-time property does not deteriorate.

The localization processing portion 15 of the signal processor 1 of the present embodiment is not an essential element in the present invention.

Modifications

The signal processor 1 of a first modification will be described with reference to FIG. 8. The signal processor 1 of the modification is an example in which contents data containing an audio signal of one object is input. Description of the elements the same as those of the signal processor 1 of the above-described embodiment is omitted.

Figure 8:
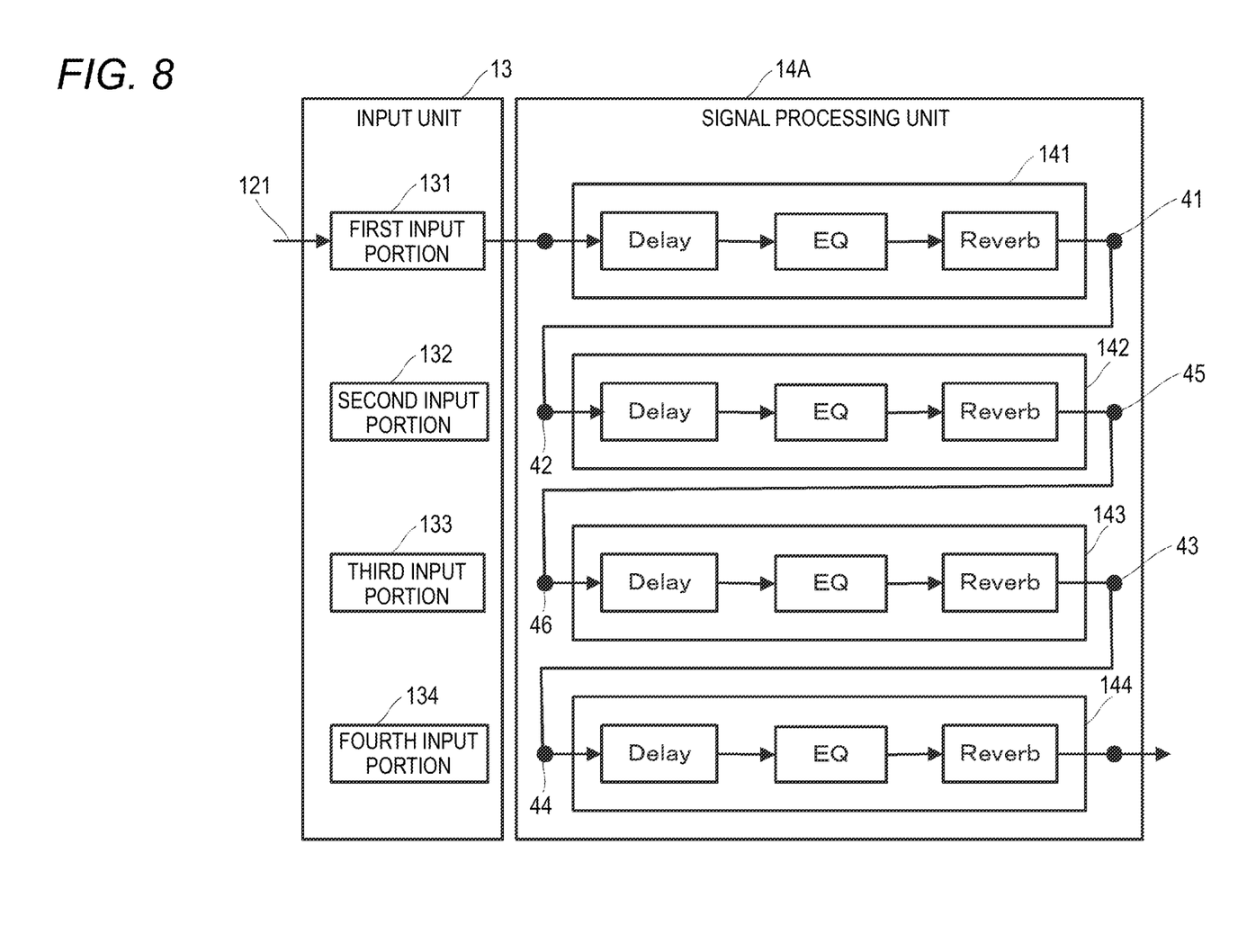
FIG. 8 is a view showing the relation of connection between an input unit and a signal processing unit of a first modification.

FIG. 8 is a view showing the relation of connection between the input unit 13 and a signal processing unit 14A of the first modification.

As shown in FIG. 8, the first input portion 131 of the input unit 13 of the first modification inputs the audio signal of the first channel 121. The second input portion 132, the third input portion 133 and the fourth input portion 134 input no audio signal. That is, in this example, the second channel 122, the third channel 123 and the fourth channel 124 are not used.

The CPU 18 causes the second signal processing portion 142, the third signal processing portion 143 and the fourth signal processing portion 144 to process the audio signal of the first channel 121.

In more detail, the CPU 18 connects the output end 41 on the output side of the first signal processing portion 141 and the input end 42 on the input side of the second signal processing portion 142 together. Moreover, the CPU 18 connects an output end 45 on the output side of the second signal processing portion 142 and an input end 46 on the input side of the third signal processing portion 143 together. Further, the CPU 18 connects an output end 43 on the output side of the third signal processing portion 143 and an input end 44 on the input side of the fourth signal processing portion 144 together.

The first signal processing portion 141 inputs the audio signals of the first input portion 131 to the first channel 121. The signal processing portions 141 to 144 perform signal processing of the audio signal of the first channel 121. The signal processing unit 14A outputs the signal-processed audio signal to the localization processing portion 15 from the fourth signal processing portion 144.

As described above, the signal processing unit 14A of the signal processor 1 of the first modification can perform signal processing of the signal processing portions 141 to 144 on the audio signal of the first channel 121. That is, if the number of audio signals is smaller than the number of channels, processing can be increased by using the signal processing portion corresponding to the unused channel. In this case also, in the signal processor 1 of the first modification in which signal processing is performed in one frame, resources can be effectively used and no delay is caused.

Consequently, with the signal processor 1 of the first modification, by using a multiplicity of effects on the audio signal of the first channel 121, more diverse expressions can be performed with already secured resources.

Figure 9:
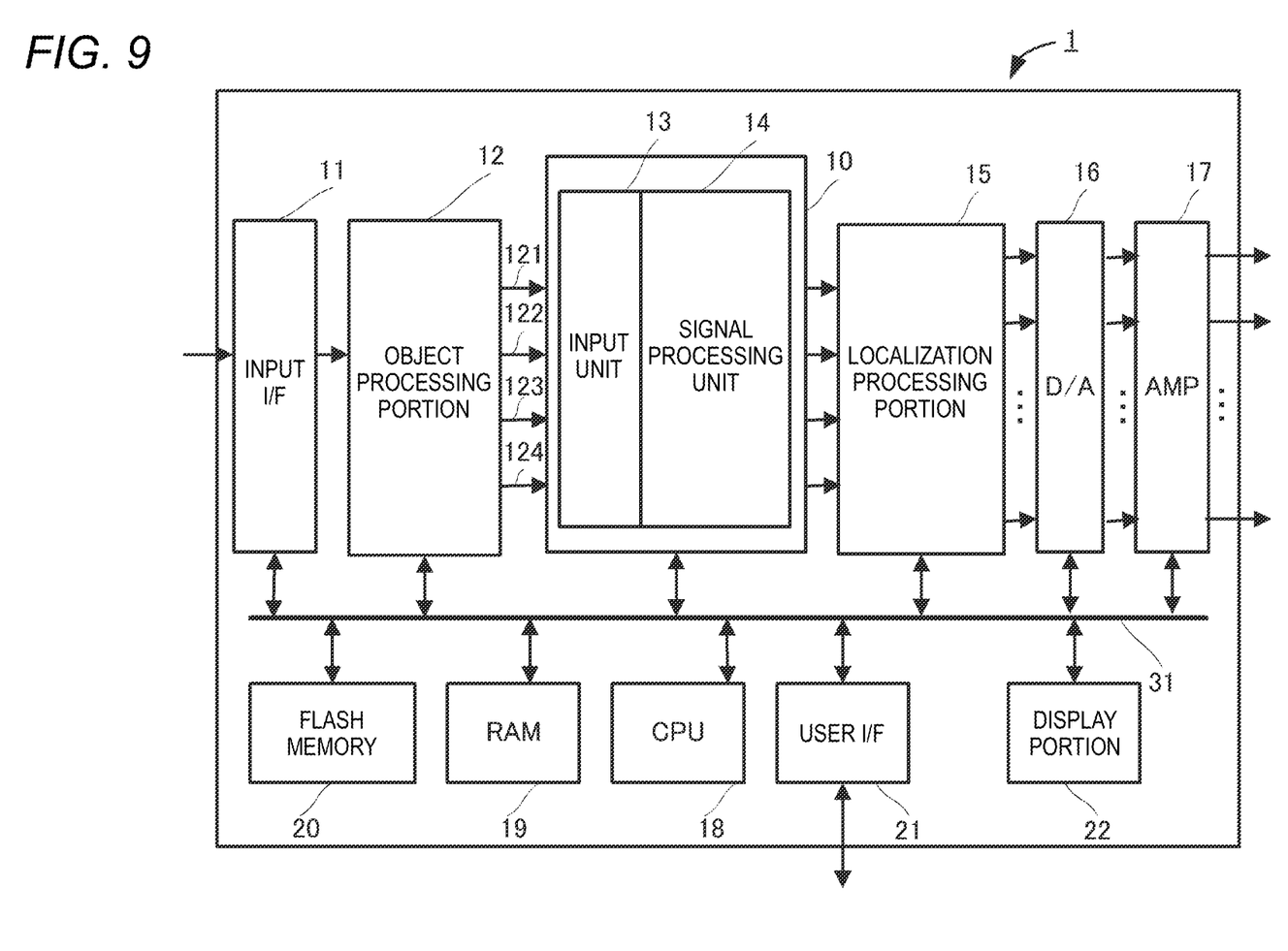
FIG. 9 is a block diagram showing the structure of a principal part of the signal processor of second and third modifications.

A signal processor 1A of a second modification will be described with reference to FIG. 9. FIG. 9 is a block diagram showing the structure of a principal part of the signal processor 1A of the second modification. The signal processor 1A of the second modification is different from the signal processors 1 of the above-described embodiment and the first modification in that a user interface (I/F) 21 and a display portion 22 are further provided. Description of the elements the same as those of the signal processor 1 of the above-described embodiment is omitted.

The display portion 22 is a display device that causes a display device (not shown) to display an unused channel, for example, a monitor of a personal computer.

Moreover, the user I/F 21 is provided with a signal input instruction button (not shown) and the like for each of a plurality of channels 121 to 124. For example, in a case where the second channel 122 is not used, when the user depresses the signal input instruction button corresponding to the second channel 122, the CPU 18 causes the second signal processing portion 142 corresponding to the unused second channel 122 to process the audio signal of the first channel 121.

Thereby, the signal processor 1A of the second modification can grasp the channel not used by the user through the display portion 22. Moreover, the signal processor 1A of the second modification can effectively use the resource for the audio signal of the unused channel according to an instruction of the user. Further, since the signal processor 1A of the second modification processes the audio signal in one frame, even when the user I/F 21 accepts an instruction from the user, deterioration of real-time property can be reduced.

The user I/F 21 may be connected to a user operable external device wirelessly or by wire.

Moreover, the display portion 22 is, for example, a display configured by laminated touch panels, and may display a GUI (graphical user interface) screen for accepting operations by the user. In this case, the display portion 22 displays a signal input instruction button on the GUI screen, and the user I/F 21 accepts an instruction according to the user's operation.

Moreover, the signal processor 1A of the second modification may be used in combination with the signal processor 1 of the first modification.

The signal processor 1A of a third modification will be described with reference to FIG. 9. Description of the elements the same as those of the signal processor 1 of the above-described embodiment is omitted.

In the signal processor 1A of the third modification, the sound image position of the object is changed by an instruction of the user. In this case, the user I/F 21 accepts a change instruction by the user using the GUI screen (not shown). On the GUI, for example, an imitative view showing the room and the positions of the speakers is shown. That is, by the user touching or swiping the place where the user intends to change the sound image position on the GUI, the user I/F 21 accepts the sound image position change instruction and change position. The CPU 18 distributes the audio signal of the objects to the speakers with a predetermined gain so that the sound image is localized according to the changed position.

The signal processor 1A of the third modification may use the signal processors 1 and 1A of the first and second modifications in combination.

Thereby, with the signal processor 1A of the third modification, the sound image position can be changed by the user.

The programs executed in the present embodiment and the modifications are not necessarily stored in the flash memory 20 of the own devices. For example, the signal processors 1 and 1A may download programs from another device such as a server as appropriate and read them to the RAM 19.

Moreover, the signal processors 1 and 1A of the present embodiment and the modifications are described with respect to the examples provided with four channels, the present invention is not limited thereto. The signal processors 1 and 1A of the present invention may be structured so as to be provided with less than four channels and perform signal processing of the audio signals of these channels in one frame. Moreover, the signal processor 1 of the present invention may be structured so as to be provided with more than four channels and perform signal processing of the audio signals of these channels in one frame.

Moreover, the kinds of signal processing of the first signal processing portion 141 may be different from those of the second signal processing portion 142. In this case, for example, for the first signal processing portion 141, an effect such as chorus may be added besides delay, EQ and reverb.

Doing this enables the signal processors 1 and 1A of the present embodiment and the modifications to perform a wide variety of expressions with already secured resources.

The descriptions of the present embodiment should be considered illustrative in all respects and not restrictive. The scope of the present invention is shown not by the above-described embodiment but by the scope of the claims. Further, it is intended that all changes within the meaning and the scope equivalent to the scope of the claims are embraced by the scope of the present invention.

What is claimed is:

1. A signal processor comprising:
   a memory storing instructions; and
   a processor that implements the stored instructions to execute a plurality of tasks, including:
     a first input task configured to obtain a first audio signal of a first channel;
     a second input task configured to obtain a second audio signal of a second channel;
     a first signal processing task configured to perform a first signal processing on the input first audio signal and output a processed first audio signal;
     a second signal processing task configured to perform a second signal processing on the a select first input second audio signal, and output a processed first select audio signal; and
     a control task configured to automatically select:
       in a first state where the first audio signal is obtained and the second audio signal is obtained, the second audio signal as the select first input audio signal so that the second signal processing is performed only on the second audio signal; and
       in a second state where the first audio signal is obtained and the second audio signal is not obtained, the processed first audio signal as the select first input audio signal so that the second signal processing is performed only on the processed first audio signal.

2. The signal processor according to claim 1, wherein the plurality of tasks further include:
   a third input task configured to obtain a third audio signal of a third channel; and
   a third signal processing task configured to perform a third signal processing on a select second input audio signal, and output a processed second select audio signal,
   wherein the control task automatically selects:
     in a third state where the first audio signal is obtained, the second audio signal is obtained, and the third audio signal is obtained, the third audio signal as the select second input audio signal so that the third signal processing is performed only on the third audio signal; and
     in a fourth state where the first audio signal is obtained and the second and third audio signals are not obtained, the processed first select audio signal as the select second input audio signal so that the third signal processing is performed only on the processed first select audio signal.

3. The signal processor according to claim 1, wherein the plurality of tasks further include an object processing task configured to extract an audio signal of each object from contents data and assign the extracted audio signal of each object to the first channel or the second channel.

4. The signal processor according to claim 3, wherein the plurality of tasks further include a localization processing task configured to perform sound image localization of each object based on position data indicating a position of the respective object obtained by the object processing task.

5. The signal processor according to claim 1, wherein a kind of the first signal processing is the same as that of the second signal processing.

6. The signal processor according to claim 1, wherein a kind of the first signal processing is different from that of the second signal processing.

7. The signal processor according to claim 1, wherein:
the plurality of tasks further include a temporary storing task configured to temporarily store information in a temporary storage,
the control task allocates the temporary storage in advance for a resource of the first signal processing and a resource of the second signal processing.

8. The signal processor according to claim 1, wherein the control task causes the first signal processing task and the second signal processing task to perform a plurality of kinds of signal processing.

9. The signal processor according to claim 1, wherein the first signal processing task performs the first signal processing on the input first audio signal for each frame.

10. A signal processing method for a signal processor including an input interface for inputting an audio signal, the signal processing method comprising:
obtaining a first audio signal of a first channel input to the input interface;
obtaining a second audio signal of a second channel input to the input interface;
performing a first signal processing on the input first audio signal and outputting a processed first audio signal;
performing a second signal processing on a select first input audio signal, and outputting a processed first select audio signal;
automatically selecting, in a first state where the first audio signal is obtained and the second audio signal is obtained, the second audio signal as the select first input audio signal so that the second signal processing is performed only on the second audio signal; and
automatically selecting, in a second state where the first audio signal is obtained and the second audio signal is not obtained, the processed first audio signal as the select first input audio signal so that the second signal processing is performed only on the processed first audio signal.

11. The signal processing method according to claim 10, further comprising:
obtaining a third audio signal of a third channel input to the input interface;
performing a third signal processing on a select second input audio signal, and outputting a processed second select audio signal;
automatically selecting, in a third state where the first audio signal is obtained, the second audio signal is obtained, and the third audio signal is obtained, the third audio signal as the select second input audio signal so that the third signal processing is performed only on the third audio signal; and
automatically selecting, in a fourth state where the first audio signal is obtained and the second and third audio signals are not obtained, the processed first select audio signal as the select second input audio signal so that the third signal processing is performed only on the processed first select audio signal.

12. The signal processing method according to claim 10, further comprising:
extracting an audio signal for each object from content data; and
assigning the extracted audio signal of each object to the first channel or the second channel.

13. The signal processing method according to claim 12, further comprising performing sound image localization of each object based on position data indicating a position of the obtained respective object.

14. The signal processing method according to claim 10, wherein a kind of the first signal processing is the same as that of the second signal processing.

15. The signal processing method according to claim 10, wherein a kind of the first signal processing is different from that of the second signal processing.

16. The signal processing method according to claim 10, further comprising allocating a temporary storage in advance for a resource of the first signal processing and a resource of the second signal processing, to temporarily store information.

17. The signal processing method according to claim 10, wherein the first signal processing and the second signal processing each perform a plurality of kinds of signal processing.

18. The signal processing method according to claim 10, wherein the second signal processing is performed after performing the first signal processing on the input first audio signal.

* * * * *